United States Patent
Badey et al.

(10) Patent No.: US 8,237,323 B2
(45) Date of Patent: Aug. 7, 2012

(54) ROTOR FOR AN ELECTRICAL MACHINE COMPRISING AN INTERMEDIATE SLEEVE INTERPOSED BETWEEN AT LEAST ONE POLAR WHEEL AND A SHAFT ON WHICH IT IS MOUNTED

(75) Inventors: Jean-Philippe Badey, Etaples sur Mer (FR); Romaric Lenoir, Sainte Cecile (FR); Marc Tunzini, Versailles (FR); Pierre-Yves Bilteryst, Brimeux (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 11/909,106

(22) PCT Filed: Mar. 31, 2006

(86) PCT No.: PCT/FR2006/000715
§ 371 (c)(1),
(2), (4) Date: Sep. 19, 2007

(87) PCT Pub. No.: WO2006/103361
PCT Pub. Date: Oct. 5, 2006

(65) Prior Publication Data
US 2008/0315714 A1    Dec. 25, 2008

(30) Foreign Application Priority Data
Mar. 31, 2005    (FR) ....................... 05 03109

(51) Int. Cl.
*H02K 1/28* (2006.01)
*H02K 1/24* (2006.01)
(52) U.S. Cl. ............... 310/263; 310/156.12; 310/156.66; 310/216.121

(58) Field of Classification Search .................. 310/263, 310/156.08, 156.12, 156.13, 156.66–156.73, 310/216.121, 216.113; *H02K 1/28, 1/22, H02K 1/24*
See application file for complete search history.

(56) References Cited

U.S. PATENT DOCUMENTS

| | | | |
|---|---|---|---|
| 2,795,715 A * | 6/1957 | Gilchrist | 310/263 |
| 3,646,376 A * | 2/1972 | Anderson | 310/263 |
| 3,694,906 A | 10/1972 | Rank et al. | |
| 4,886,392 A | 12/1989 | Iio | |
| 4,888,508 A | 12/1989 | Adam et al. | |
| 4,980,595 A * | 12/1990 | Arora | 310/263 |
| 5,122,705 A | 6/1992 | Kusase et al. | |

(Continued)

FOREIGN PATENT DOCUMENTS

EP    0454039 A1    10/1991

(Continued)

*Primary Examiner* — Quyen Leung
*Assistant Examiner* — Michael Andrews
(74) *Attorney, Agent, or Firm* — Jacox, Meckstroth & Jenkins (57) ABSTRACT

An electrical rotating machine rotor, in particular for a motor vehicle, comprising a central shaft, an annular core coaxial with the shaft and two polar wheels which are axially arranged on either side of the core, of the type wherein the shaft includes at least one drive section which is axially force-fitted into a fixing bore of at least one component of the rotor so as to secure in rotation at least one of the two polar wheels of the rotor to the shaft, an intermediate sleeve being radially interposed between each polar wheel and the central shaft, and on which sleeve is mounted said polar wheel. The invention also concerns a method for making such a rotor.

11 Claims, 3 Drawing Sheets

U.S. PATENT DOCUMENTS

| | | | |
|---|---|---|---|
| 5,158,390 A | 10/1992 | Ito et al. | |
| 5,177,391 A * | 1/1993 | Kusase | 310/263 |
| 5,459,364 A | 10/1995 | Rondier | |
| 5,789,832 A * | 8/1998 | Hwang | 310/263 |
| 5,977,668 A * | 11/1999 | Yoshioka | 310/263 |
| 6,002,219 A | 12/1999 | Permuy | |
| 6,069,432 A | 5/2000 | Norell et al. | |
| 6,713,928 B2 | 3/2004 | Takizawa et al. | |
| 6,867,530 B2 * | 3/2005 | Gamm et al. | 310/263 |
| 6,897,597 B1 | 5/2005 | Armiroli et al. | |
| 7,053,518 B2 | 5/2006 | Fujita et al. | |
| 2002/0175589 A1 | 11/2002 | Takizawa et al. | |
| 2005/0116581 A1 | 6/2005 | Fujita et al. | |
| 2005/0242680 A1 * | 11/2005 | Militello et al. | 310/194 |
| 2007/0014843 A1 | 1/2007 | Dobak | |

FOREIGN PATENT DOCUMENTS

| | | |
|---|---|---|
| FR | 2710200 A1 | 3/1995 |
| FR | 2737063 A1 | 1/1997 |
| FR | 2745445 A1 | 8/1997 |
| FR | 2774524 A1 | 8/1999 |
| FR | 2784248 A1 | 4/2000 |
| JP | 61214736 A | 9/1986 |
| JP | 9037519 A | 2/1997 |
| JP | 9121486 A | 5/1997 |
| JP | 2000232744 A | 8/2000 |
| JP | 2003324873 A | 11/2003 |
| JP | 2003333780 A | 11/2003 |
| JP | 2004350473 A | 12/2004 |
| WO | 2004106748 | 12/2004 |

* cited by examiner

ROTOR FOR AN ELECTRICAL MACHINE COMPRISING AN INTERMEDIATE SLEEVE INTERPOSED BETWEEN AT LEAST ONE POLAR WHEEL AND A SHAFT ON WHICH IT IS MOUNTED

FIELD OF THE INVENTION

The invention concerns a rotor for a rotary electrical machine, such as an alternator or an alternator-starter, in particular for a motor vehicle.

DESCRIPTION OF THE RELATED ART

The invention concerns more particularly a rotor for a rotary electrical machine, such as an alternator or an alternator-starter, in particular for a motor vehicle, which comprises:
a central shaft;
an annular core coaxial with the shaft;
a coil that extends radially around the core;
and two pole pieces that are arranged axially on each side of the core and coil;
of the type in which the shaft comprises at least one driving portion whose cross section, along a radial plane, is not smooth, and which is axially force-fitted in a bore for fixing at least one component of the rotor so as to rotationally fix at least the two pole pieces of the rotor to the shaft.

Rotors of this type are already known in which the core is divided axially into two distinct portions and each portion is produced in one piece with one of the pole pieces.

When the rotor is assembled, the two pieces are first of all pressed against each other on each side of the coil so that the facing internal radial faces of the two portions of the core are pressed against each other, in order to ensure a good abutment of the two faces so as to allow optimum passage of the magnetic flux through the core.

The angular positioning of one piece with respect to the other is achieved by means of locating fingers interposed between the two pole pieces in a temporary fashion during pressing.

In addition, the two core portions have a conical shape so that, under the pressing force, the coil is deformed radially and thus clamped around the core so as to be kept rotationally integral with the core.

Next, the shaft is force-fitted in the bores in the pole pieces. A driving portion of the shaft, which is received in the bores, comprises reliefs, for example knurling in the form of flutes or serrations, in order to rotationally connect the shaft and pole pieces.

According to another known embodiment of the rotor, the core is formed in a single piece that is distinct from the two pole pieces. The coil is wound around the core. The pieces are then positioned axially on each side of the core. Then an axial pressing force is applied to the pieces so that their internal radial faces are pressed against the core so as to ensure optimum passage of a magnetic flux between the core and each pole piece.

While the pole pieces are under stress, the driving portion of the shaft is force-fitted in the pieces and in the central tube.

However, in these two known embodiments, the driving portion of the shaft, and in particular the serrations, do not make it possible to obtain a sufficiently precise concentricity of the pole pieces and/or of the core with respect to the rotation axis of the shaft. The central bore of each pole piece is in fact deformed plastically in a radial direction in an uneven manner. This is because it is found that the serrations do not uniformly penetrate the central bores of the pole pieces and core.

To correct this lack of centering, it is necessary to perform an operation of machining the external peripheral face of the pole pieces after they are mounted in order to guarantee concentricity between the external periphery of the rotor and the rotation axis of the shaft.

During this machining operation, hot shavings are liable to be thrown onto the winding, which thus risks being damaged.

In addition, this machining operation cannot be carried out using a lubricant, which also risks damaging the coil. The machining operation is therefore made more lengthy and more expensive.

Moreover, the force necessary for axially pressing the pole pieces against each other does not make it possible to obtain a precise axial positioning of the pieces with respect to each other.

In addition, the serrations on the driving portion of the shaft are never oriented in a perfectly rectilinear fashion in an axial direction, but are generally slightly helical in shape around this shaft, which constitutes a defect. Thus, when the driving portion of the shaft is fitted in the pole pieces pressed against each other, the helical shape of the serrations causes the appearance of a torsion force between the bore of each pole piece and the shaft, which is liable to cause a relative rotation movement of the two pole pieces with respect to each other when the axial force is released.

This relative movement causes a circumferential misalignment between the pole pieces and in particular the teeth thereof.

Finally, pressing the pole pieces against each other prior to the fitting of the shaft has the effect of making their material flow towards the internal bore. This has the consequence of reducing the inside diameter of the bore of the pole pieces. The fitting force necessary for fitting the shaft in the pole pieces is therefore increased accordingly and the shaft is liable to buckle, since the rear end of the shaft has a smaller diameter in order in particular to mount collecting rings.

SUMMARY OF THE INVENTION

In order to resolve these problems, the invention proposes a rotor and further comprising at least one intermediate sleeve that is interposed radially between each pole piece and the central shaft, and on which the pole piece is mounted, and in that the driving portion of the shaft is fitted axially in a fixing bore produced in the intermediate sleeve or in the core.

By virtue of the invention the operation of machining the external peripheral face of the pole pieces, that is to say the operation of machining the external periphery of the claw rotor, is carried out in advance without the presence of the excitation coil of the rotor so that this excitation coil does not risk being damaged by the projection of shavings. This machining operation can be carried out with the help of a lubricant so that the service life of the machining tool is increased.

The air gap between the internal periphery of the stator body, which the rotary electrical machine has, and the external periphery of the rotor of this machine is therefore carried out without subsequent machining of the rotor.

In one embodiment it is possible to machine helical grooves in advance at the external periphery of the rotor in order to cut the eddy currents developed at the external periphery face of the pole pieces, as described in the document FR 2 774 524.

In addition it is possible easily to machine the external periphery of the intermediate sleeve or sleeves in order to have good concentricity of the sleeve or sleeves with respect to the axis of the shaft. The pole pieces are being machined before they are mounted on the sleeve or sleeves, which constitute centering sleeves.

In addition it is possible to standardize the outside diameter of the intermediate sleeve or sleeves in order to mount pole pieces of different sizes.

In one embodiment the intermediate centering sleeve is distinct from the central shaft.

Thus, by virtue of the invention, it is possible to use the same central shaft as in the prior art and the force for fitting the central shaft in the intermediate sleeve or sleeves is reduced, so that the rear end of the shaft is preserved.

In another embodiment each pole piece has a portion of core associated with the smooth centering sleeve issuing from the central shaft, each sleeve being extended by a non-smooth driving portion of the central shaft, the said driving portion being offset axially with respect to the sleeve.

In this case the outside diameter of a first one of the two sleeves of the central shaft is greater than the outside diameter of the second sleeve of the central shaft and the same applies to the complementary inside diameters of the first portion of the core and of the second portion of the core.

By virtue of these stagings in diameter it is possible to force-fit each non-smooth portion of the shaft in the portion of the core concerned, the sleeve with the smallest outside diameter and the associated non-smooth driving portion of the shaft passing through the core portion with the largest inside diameter.

The non-smooth portions of the shaft have a short axial length so that the outside diameters of the pole pieces can be machined in advance.

According to other characteristics of the rotor, taken in isolation or in combination:
 the intermediate sleeve comprises a cylindrical surface coaxial with the central shaft that is associated with each pole piece and that is received in a complementary central cylindrical bore in the associated pole piece, so as to position the associated pole piece coaxially with the shaft;
 the intermediate sleeve is interposed between the core and the shaft;
 the core is at least partly formed in one piece with one of the pole pieces;
 the core is produced in at least two distinct portions axially and in that each portion of the core is formed in one piece with the adjacent pole piece;
 the core and the pole pieces are distinct elements;
 the rotor comprises a single sleeve;
 the rotor comprises a plurality of sleeves;
 the shaft is fitted directly in the core;
 the rotor comprises at least two sleeves, each of which is associated with a pole piece and which are arranged axially on each side of the core;
 the sleeves are produced in one piece with the core so as to form a single hub;
 the rotor comprises means of axial positioning of the pole pieces with respect to each other along the shaft;
 each pole piece comprises an internal radial face that is in abutment axially against a facing external radial face of the core;
 each core portion comprises an internal radial face that are axially in abutment against each other;
 the rotor comprises means for connecting the pole pieces with the intermediate sleeve in rotation about the axis of the central shaft;
 the pole piece and the intermediate sleeve are fixed together by welding;
 the pole piece and the sleeve are fixed together by crimping;
 the pole piece or the sleeve comprises a bevel in an arc of a circle for crimping the other part;
 the sleeve is produced from a ferromagnetic material.

The invention also proposes a method of producing such a rotor, of the type that comprises:
 a step of mounting the core;
 a step of mounting the coil;
 a step of mounting each pole piece;
 a step of adjusting the concentricity of each pole piece with respect to the shaft;
 a step of adjusting the axial position of the pole pieces with respect to each other.

This method is characterized in that it comprises a step of mounting the intermediate sleeve that is prior to the step of mounting the pole piece or pieces associated with the intermediate sleeve.

In one embodiment the intermediate sleeve is distinct from the pole pieces and the mounting step consists of axially force-fitting the driving portion in the bore of the intermediate sleeve.

According to another characteristic of the method:
 the step of adjusting the concentricity comprises a first operation of machining the sleeve, in order to form the cylindrical surface or surfaces able to receive each pole piece;
 the operation of machining the sleeve is carried out subsequently to the step of mounting the sleeve;
 the step of mounting each pole piece consists of fitting the associated cylindrical surface of the sleeve in the bore of each piece;
 the step of adjusting the concentricity of each pole piece comprises a second operation of machining the bore of each pole piece;
 the step of adjusting the concentricity comprises a third operation of machining the external peripheral cylindrical face of the pole piece;
 the step of adjusting the axial positioning of each pole piece comprises a first operation of machining the internal radial face of the piece;
 the step of adjusting the axial positioning comprises a second operation of machining each external radial face of the core prior to the step of mounting each pole piece;
 a second operation of machining the external radial face of the core is subsequent to the step of mounting the core;
 the step of mounting the core is carried out simultaneously with the step of mounting the pole pieces;
 the step of mounting the intermediate sleeve is carried out simultaneously with the step of mounting the core and consists of axially fitting the driving portion of the shaft in the bore of the core;
 the method comprises a final step of making each pole piece integral with the associated sleeve, with respect to rotation and translation with the shaft.

Other objects and advantages of the invention will be apparent from the following description, the accompanying drawings and the appended claims.

BRIEF DESCRIPTION OF THE DRAWINGS

Other characteristics and advantages will emerge during a reading of the following detailed description, for an understanding of which reference should be made to the accompanying drawings, among which.

DESCRIPTION OF THE PREFERRED EMBODIMENTS

In the remainder of the description, analogous, similar or identical elements will be designated by the same reference number.

Figure 1:
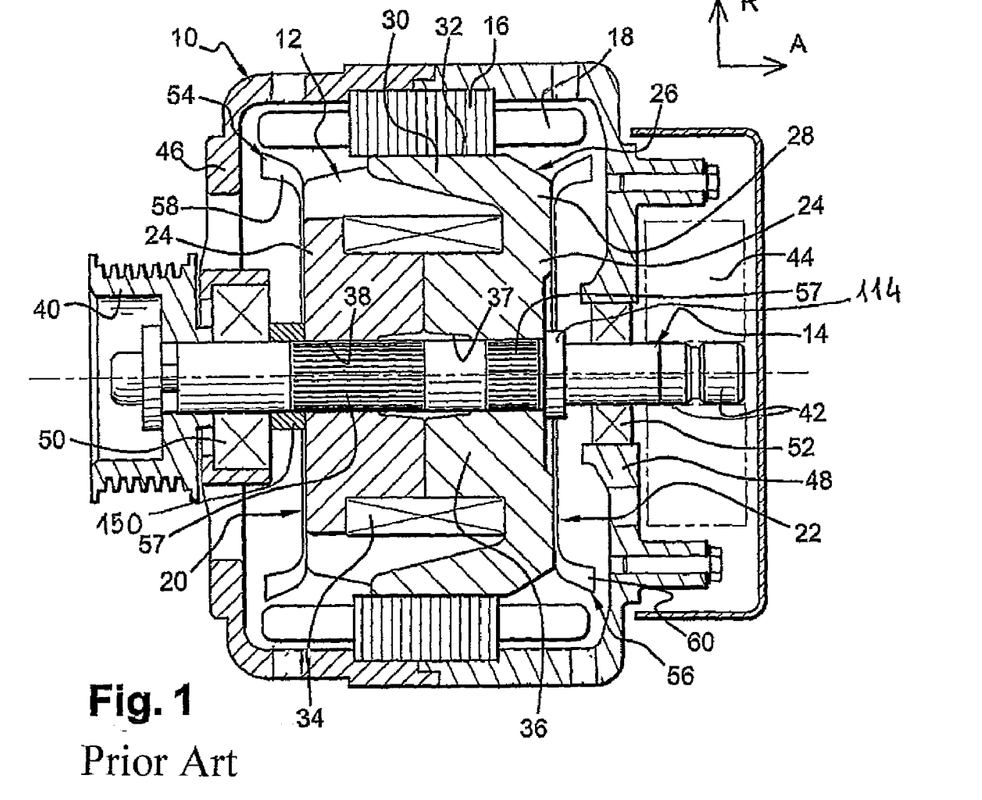
FIG. 1 is a view in axial section that depicts an alternator provided with a rotor of the prior art.

In the remainder of the description an axial and radial orientation will be adopted, indicated by the arrows 'A' and 'R' in FIG. 1.

In addition, radial faces oriented towards the middle of the core will be termed internal faces while the faces oriented in an opposite direction will be termed external faces.

The internal and external radial faces are therefore axial end faces of the core.

Likewise, axial faces oriented towards the rotation axis of the shaft will be termed internal faces while axial faces oriented in an opposite direction will be termed external faces.

Referring to FIG. 1, this depicts a rotary electrical machine of the prior art, in the present case an alternator with internal ventilation of the polyphase type for a motor vehicle with a thermal engine functioning in alternator mode. Naturally the alternator can also be reversible and consist of an alternator-starter also functioning in electric motor mode in particular in order to start the thermal engine of the vehicle as described in the document FR A 2 745 445 (corresponding to U.S. Pat. No. 6,002,219).

When the machine is functioning in alternator mode it converts mechanical energy into electrical energy like any alternator. When the machine is functioning in electric motor mode, in particular in starter mode for starting the thermal engine of the vehicle, it converts electrical energy into mechanical energy.

This machine comprises essentially a casing 10 and, inside it, a rotor 12 rotationally integral with a shaft, rotor shaft, single-piece shaft or central shaft 14, referred to as the rotor shaft, and a stator 16 that surrounds the rotor 12 and comprises a body in the form of a packet of metal sheets provided with recesses, for example of the semi-closed type, for mounting a stator coil 18 forming, on each side of the stator 16 at each axial end thereof, a coil end.

This stator coil 18 comprises for example a set of three-phase windings in a star or delta, the outputs of which are connected to a bridge rectifier (not shown) comprising rectifying elements such as diodes or transistors of the MOSFET type, in particular when the machine is of the reversible type, and consists of an alternator-starter as described for example in the document FR-A-2.745.445 (U.S. Pat. No. 6,002,219).

The windings are obtained by means of a continuous electrically conductive wire covered with an insulating layer and mounted in the relevant recesses in the body of the stator 16.

In a variant that is not shown, for better filling of the recesses of the body of the stator 16, the windings are produced by means of conductors in the form of bars, such as pins, connected together for example by welding.

According to another variant that is not shown, in order to reduce the degree of ripple and magnetic noise, the stator coil 18 comprises two sets of three-phase windings to form a composite stator winding device, the windings being offset by thirty degrees electrical as described for example in the documents US-A1-2002/0175589, EP-0.454.039 and FR-A-2.784.248. In this case two bridge rectifiers are provided and all combinations of three-phase windings in star and/or delta are possible.

In a variant the stator winding is of the pentaphase type.

In general terms the alternator is of the polyphase type and the bridge rectifier or rectifiers in particular rectify the alternating current produced in the windings of the stator 16 to a DC current in particular in order to charge the battery (not shown) of the motor vehicle and supply the loads and electrical consumers in the onboard system of the motor vehicle.

The rotor 12 is produced in the example shown in the form of a claw rotor, as described for example in the documents US-A1-2002/0175589 and EP-A1-0.454.039, comprising two pole pieces 20, 22, here axially juxtaposed and each having an annular-shaped transverse flange 24 provided at its external periphery with claws 26.

Each claw 26 comprises an implantation portion 28 transversely oriented in the plane of the flange 24 concerned. This implantation portion 28 is extended at its external periphery by a tooth 30 of axial orientation overall.

An annular air gap exists between the external peripheral face 32 of the teeth 30 and the internal periphery of the body of the stator 16.

The teeth 30 are overall trapezoidal or triangular in shape and are directed axially towards the flange 24 of the other pole piece 20, 22, the tooth 30 of one pole piece 20, 22 penetrating the space existing between two adjacent teeth 30 of the other pole piece 20, 22, so that the teeth 30 of the pole pieces 20, 22 are interleaved.

An excitation coil 34 is located axially between the flanges 24 of the pole pieces 20, 22. It is carried by a part of the rotor 12 in the form of a cylindrical annular core 36 coaxial with the shaft 14, which comprises a central bore 37. The core 36 here consists of two axially distinct portions, each of which is produced in one piece with associated pole pieces 20, 22 as shown in FIG. 1.

According to a variant that is not shown, the central core 36 consists of a single piece and is distinct from the pole pieces 20, 22, which are arranged axially on each side of the core 36.

In the remainder of the description, the term 'coil' without qualification will be understood to be the excitation coil 34 rather than the stator coil 18.

The excitation coil 34 is therefore located in the space delimited radially by the claws 26 of the pole pieces 20, 22 and the central core 36.

The pole pieces 20, 22 and the core 36 are preferably made from ferromagnetic material and have the rotor shaft 14, also made from ferromagnetic material, passing through it coaxially. For this purpose, each pole piece 20, 22 comprises a central or fixing bore 38 that passes axially through the flange 24 and extends the central bore 37 of the part of the core 36 concerned.

The wire of the excitation coil 34 is in FIG. 1 wound on a support made from electrically insulating material (not shown) mounted, preferably forcibly, on the external periphery of the core 36.

This support here has a cross section roughly in the shape of a U in order to isolate the excitation coil 34 from the flanges 24 of the pole pieces 20, 22.

According to a variant that is not shown, when the core 36 is in one part, the wire of the excitation coil 34 is wound on an insulator fixed to the core 36 and is conformed so as to prevent any contact with the flanges 24 and the teeth 30 of the pole pieces 20, 22.

When the excitation coil 34 is activated, that is to say supplied electrically, the pole pieces 20, 22 and the core 36, which are produced from ferromagnetic material, are magnetized and the rotor 12 becomes an inducing rotor with the formation of magnetic poles at the claws 26 with teeth 30 on the pole pieces 20, 22.

This inducing rotor 12 creates an induced alternating current in the stator 16 induced when the shaft 14 turns.

The shaft 14 of the rotor 12 carries at its front end a pulley 40 belonging to a device for transmitting movements by means of at least one belt (not shown) between the alternator and the thermal engine of the motor vehicle, and carries at its rear end collecting rings 42 connected by cabled connections (not shown) to the ends of the excitation coil 34 of the rotor 12.

Brushes belong to a brush holder shown in a general fashion at the reference 44 and are disposed so as to rub on the collecting rings 42 so as to supply the excitation coil 34 with electric current. The brush holder 44 is connected to a voltage regulator (not shown).

The casing 10 is here in two parts, namely a front bearing 46 adjacent to the pulley 40 and a rear bearing 48 carrying the brush holder 44 and usually the bridge rectifier or rectifiers and the voltage regulator. The bearings 46, 48 are hollow in shape and each carry centrally a ball bearing respectively 50 and 52 for the rotational mounting of the shaft 14 of the rotor 12.

The alternator also comprises means for cooling it.

For example, as illustrated in FIG. 1, the bearings 46, 48 are perforated to allow the cooling of the alternator by the circulation of air. For this purpose the rotor 12 carries at least at one of its axial ends a fan intended to provide this circulation of air. In the example shown, a first fan 54 is provided on the forward frontal face of the rotor 12 and a second fan 56, more powerful, at the rear face of the rotor 12. Each fan 54, 56 is provided with a plurality of blades or sleeves 58, 60 that are fixed to the external radial faces of the flanges 24.

According to a variant that is not shown, the alternator can also be cooled by a heat-transfer fluid, the casing 10 then being configured so as to comprise an appropriate circulation channel for the heat-transfer fluid.

It should be noted that, in the example embodiment described, the rotor 12 comprises eight teeth 30 per pole piece and therefore eight pairs of poles. Forty eight recesses are therefore provided in the body of the stator in the case in which one set of three-phase windings or two sets of three-phase windings are provided as described in the aforementioned document FR-A-2.737.063, or ninety six recesses in the solutions described in the aforementioned documents US-A1-2002/0175589 and EP-A1-0.454.039. Naturally the rotor 12 can, depending on the application, comprise a different number of pairs of poles. For example, each pole piece can comprise in a variant six teeth so that the rotor comprises six pairs of poles and the stator 16 or 72 recesses.

According to a variant that is not shown, the performance of the machine, namely its power and efficiency, can also be increased using a rotor 12 that comprises, in a known fashion and for example as described in the French patent FR-2.784.248, a certain number of permanent magnets interposed between two adjacent teeth 30 at the periphery of the stator 16, choosing the number of these magnets so that it is equal to or less than the number of poles on the rotor and their arrangement is symmetrical with respect to the axis of the rotor. For example, four, six or eight pairs of magnets are provided for eight pairs of poles.

In a known fashion, the shaft 14 comprises portions with a non-smooth radial driving section or portion 57, which are here knurled portions with axial serrations, as visible in FIG. 1, for fixing and driving the pole pieces 20, 22 and the core 36. The pole pieces 20, 22 and the core 36 are thus mounted by force-fitting on the shaft 14, so that the latter, by means of its serrations, cuts furrows in the central bore of the pole pieces 20, 22 and in the core 36 when they are force-fitted for rotational connection of the shaft with the core 36 and the pole pieces 20, 22.

As described previously, such a design of the rotor 12 poses problems when the rotor 12 is produced.

The invention therefore proposes a rotor 12, as shown in FIGS. 2 to 6, that comprises at least one intermediate sleeve 58 interposed radially between each pole piece 20, 22 and the central shaft 14, and on which the said pole piece is mounted.

In FIGS. 2 to 5 the driving portion 57 is force-fitted in a fixing bore 59 produced in the intermediate sleeve 58 distinct from the shaft 14.

Figure 6:
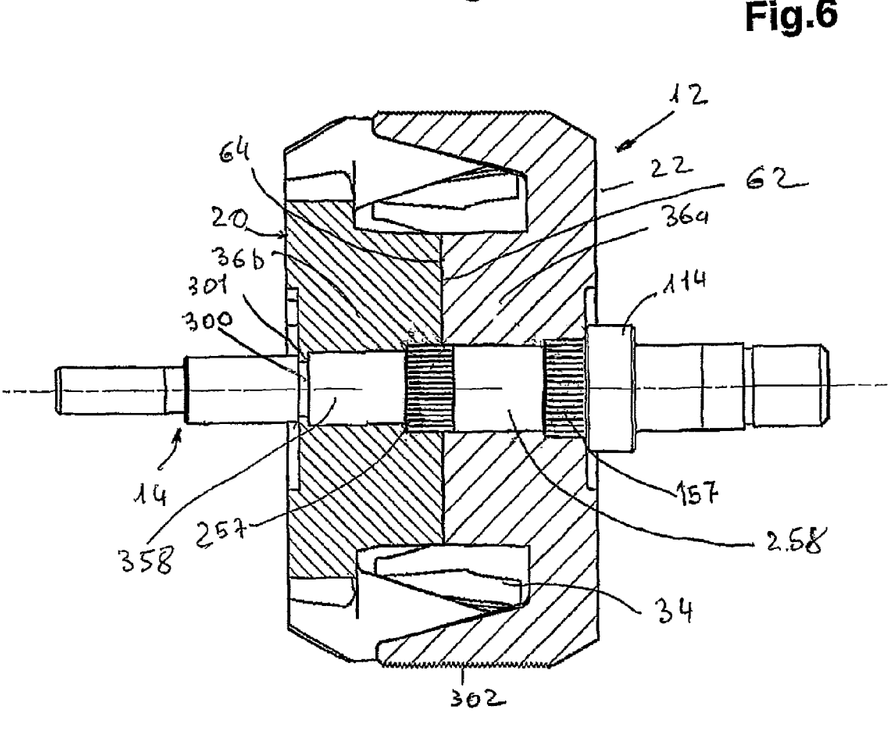
FIG. 6 is a view in axial section for a third embodiment of the invention.

In the embodiment in FIG. 6 the shaft is axially force-fitted in a fixing bore produced in the core, the intermediate sleeve issuing from the shaft and being offset axially with respect to the fixing bore.

In FIGS. 2 to 5 the intermediate sleeve 58 is interposed radially between the non-smooth driving portion 57 of the central shaft 14 and the fixing bore 38 of at least one pole piece 20, 22. This intermediate sleeve comprises, as described below, a cylindrical surface 60 coaxial with the shaft 14 and received in a complementary central cylindrical bore 38, 138 of the associated pole piece 20, 22 so as to position the pole piece coaxially with the shaft 14.

The portion 57 is here provided with reliefs so that it is non-smooth as in FIG. 1. The reliefs consist here of a knurling with serrations as in FIG. 1.

Figure 2:
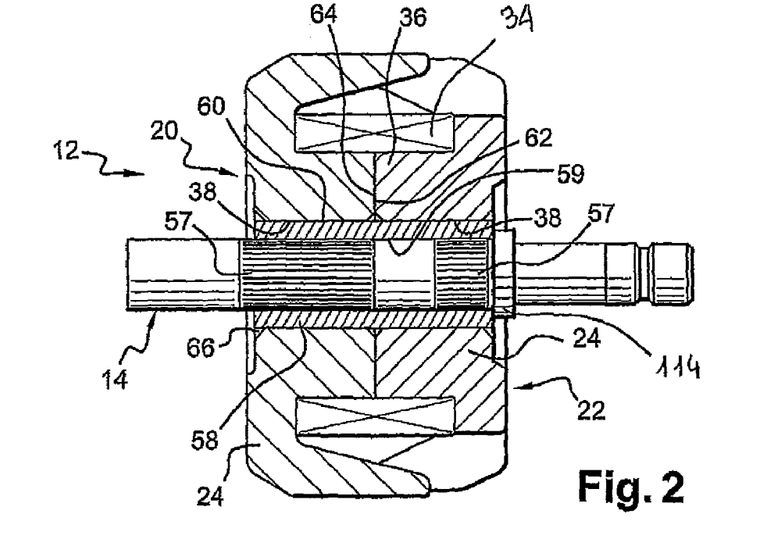
FIG. 2 is a view in axial section that depicts a rotor produced according to the teachings of the invention.

According to a first embodiment of the invention that is depicted in FIG. 2, the rotor 12 is similar to the rotor 12 depicted in FIG. 1. The rotor 12 thus comprises a central shaft 14, two pole pieces 20, 22 that are arranged axially on each side of a core 36, and an excitation coil 34 that extends radially around the core 36.

However, the rotor 12 comprises here an intermediate sleeve 58 that comprises a central fixing bore 59. The driving portions 57 of the shaft 14 are force-fitted in the fixing bore 59 of the sleeve 58.

These portions 57 comprise reliefs in the form of serrations belonging to a knurling.

The sleeve 58 comprises a cylindrical surface 60, here axially oriented, that merges here with the external peripheral cylindrical surface of the sleeve 58. The cylindrical surface 60, which is by virtue of the invention coaxial as described below with the rotation axis of shaft 14, is intended to receive the pole pieces 20, 22.

According to this embodiment of the invention, the sleeve 58 is also fitted in the core 36, so that the sleeve 58 is interposed radially between the shaft 14 and the core 36, here in two portions, that is to say in two halves, each of which is made in one piece with its associated pole piece, 20, 22.

For this purpose, the radial section of the cylindrical surface 60 has a shape complementary to the radial section of the central bore 38 of the pole pieces 20, 22. More particularly, the surface 60 has in radial section a circular shape and is in close contact with the internal periphery of the pole pieces 20, 22 delimiting the axially oriented central bore 38, which is therefore coaxial with the axis of the shaft 14.

The cylindrical surface 60 (FIG. 2) of the sleeve 58 is fitted in each central bore 38 of the pole pieces 20, 22, and consequently in the central bore of the core 36, here in two halves and which is therefore made in one piece with the pole pieces 20, 22, so that the sleeve 58 is interposed radially between the driving portion 57 of the shaft 14 and the pole pieces 20, 22. Here the sleeve 58 is also interposed radially between the driving portion 57 and the core 36.

Figure 3:
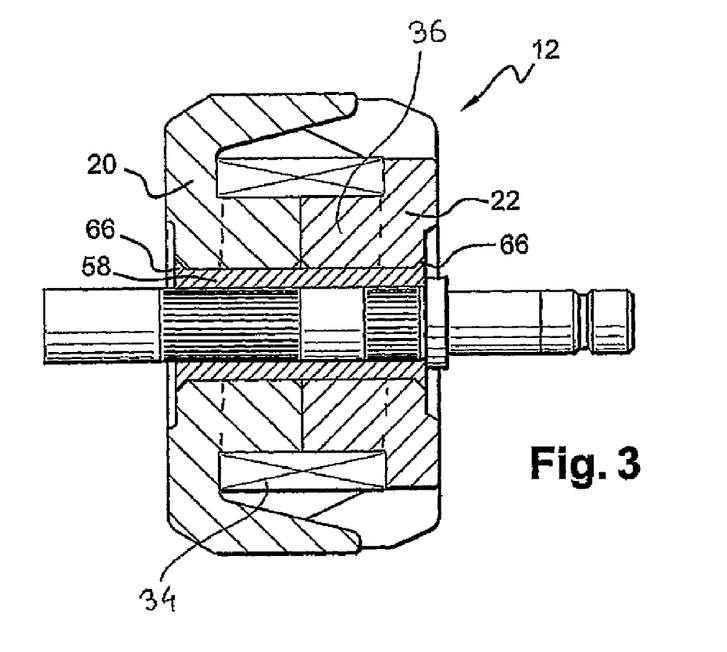
FIG. 3 is the same view as that in FIG. 2 in which the pole pieces of the rotor are fixed to the intermediate sleeve by crimping.

More precisely, in FIGS. 2 and 3, as in FIG. 1, two driving portions 57 are provided, with different axial lengths, namely a front portion longer than a rear portion.

The front axial end of the front portion 57 extends in axial projection with respect to the front axial end of the front pole piece 20 and the sleeve 58. This front portion extends to the rear through its rear end roughly as far as the internal end face or the internal radial face 62 of the core half 36 issuing from the front pole piece 20 and constituting the rear axial end of this core half and of the front pole piece.

The rear end of this rear portion 57 extends roughly as far as a shoulder or collar 114 belonging, as in FIG. 1, to a collar of the shaft 14 adjacent to the rings 42 and therefore to the rear end of the shaft 14.

Naturally in a variant the rear driving portion is omitted, all this depending on the torque to be transmitted.

The rear end of the sleeve 58 is in abutment on the shoulder 114, or more precisely on the front face of the collar 114. The front end of the sleeve 58 is intended to come into abutment on the annular strut 150 in FIG. 1 interposed axially between the front end of the sleeve 58 and the bearing 50.

The sleeve 58 is therefore intended to be mounted for axial clamping between the shoulder 114 and the strut 150 so that it makes it possible to reduce the stresses in the pole pieces 20, 22.

In this example embodiment the front end of the shaft 14 is fitted in the sleeve 58 according to the method described below. The collar 114 limits the relative axial movement of the shaft with respect to the sleeve 58 and has here an outside diameter less than that of the tubular-shaped sleeve 58 in FIGS. 2 and 3.

The axial length of the sleeve 58 is at least equal to the sum of the axial lengths of the core 36 and the fixing bores 38 of each pole piece 20, 22. Here each axial end of the sleeve 58 extends in the same radial plane as the external radial face of the flange 24 of the associated pole piece 20, 22.

It should be noted that the strut 150, in a variant, can also come into abutment on the internal periphery of the flange 24 of the front pole piece 20.

The sleeve 58 here consists of a single piece. However, the rotor 12 can also comprise a plurality of sleeves 58 that are arranged end-to-end around the shaft 14.

Advantageously, the sleeve 58 is produced from a ferromagnetic material and preferably from the same material as the pole pieces 20, 22 and the core 36.

The rotor 12 also comprises means for the axial positioning of the pole pieces 20, 22 with respect to each other axially along the shaft 14.

In the first embodiment, the axial positioning of the pole pieces 20, 22 is achieved by the facing internal radial faces 62, 64 each core half 36. These faces 62, 64 respectively delimit the rear axial end of the pole piece 20 and the front axial end of the pole piece 22. This is because, when the pole pieces 20, 22 are mounted on the shaft 14, the internal radial faces 62, 64 of each core half 36 are in abutment against each other, thus allowing the axial positioning of the pole pieces 20, 22.

It should be noted that each pole piece 20, 22 comprises respectively at its rear axial end and at its front axial end a mounting bevel to facilitate its mounting on the sleeve 58. These bevels are advantageously continuous.

In a variant, the pole pieces have no mounting bevel.

In addition, the rotor 12 comprises means for rotationally connecting the pole pieces 20, 22 with the intermediate sleeve 58, which is itself rotationally connected with here the driving portions 57 of the shaft 14.

Here (FIGS. 2 to 4) each pole piece 20, 22 also comprises respectively at its front axial end and at its rear axial end a connection bevel or annular bevel part 66.

As shown in FIGS. 2 and 3, each pole piece 20, 22 therefore comprises two bevels, namely a connection bevel 66 and a continuous mounting bevel.

Thus at least one arc of the external circular rim of the central bore 38 of each pole piece 20, 22 comprises a connection bevel 66.

Figure 4:
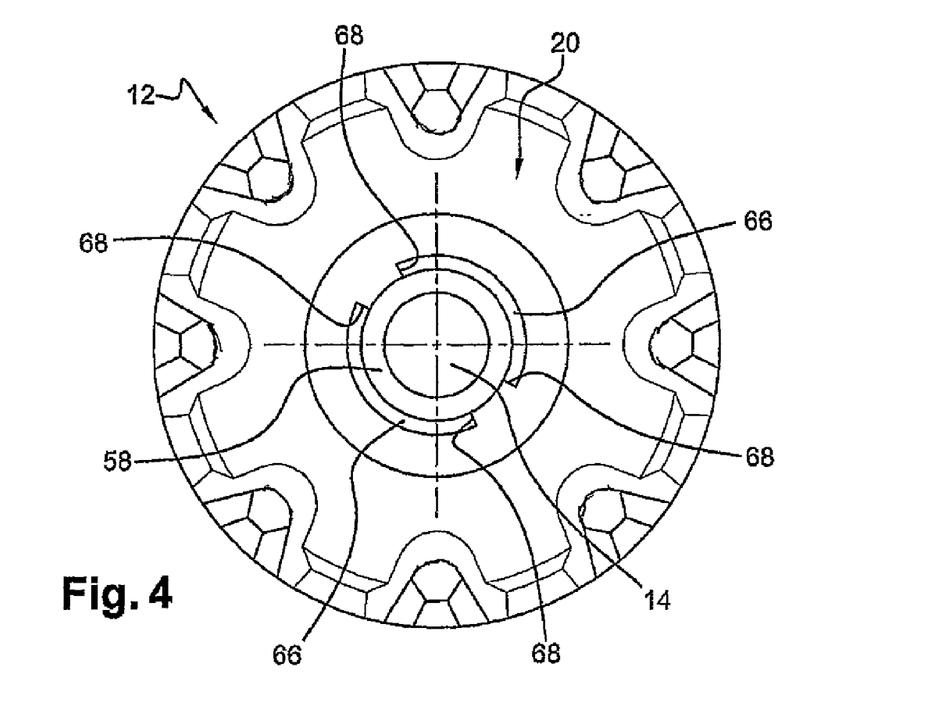
FIG. 4 is a side end view of the rotor of FIG. 2.

As shown in FIG. 4, the connection bevel 66 is able to receive by crimping a deformed material part of the sleeve 58. For this purpose, the sleeve 58 is advantageously produced from a ductile ferromagnetic material such as soft iron, which is particularly suited to crimping. The hardness of the sleeve is less than that of the central shaft 14 made from ferromagnetic material.

In addition, each bevel 66 is here in two annular parts, roughly semicircular, delimited angularly by two radial end faces 68 that make it possible to rotationally lock the pole pieces 20, 22 around the shaft 14 with respect to the sleeve 58. It is therefore essential, in order to rotationally fix together each pole piece 20, 22 and the sleeve 58, for each annular bevel part 66 to extend only over an arc of the circumference of the central bore 38 of each pole piece 20, 22 rather than over the entire circumference of the bore 38.

Each annular bevel part 66 is filled with the material of the sleeve 58, which flows, following the crimping operation, into the cavities formed by the bevel 66.

In a variant the bevel 66 comprises a number of parts greater than two, for example 3 or 4 parts.

The crimping also makes it possible to lock axially, that is to say in translation, the pole pieces 20, 22 with respect to the sleeve 58.

According to a variant of the invention that is not shown, the connection bevel is replaced or supplemented by recesses into which the material of the sleeve 58 flows. The circumferential length of the bevel 66 therefore depends on the application, in particular on the presence or not of recesses located between each bevel part.

According to a variant of the invention that is not shown, the structures are reversed so that the bevel 66 in at least two parts and/or the recesses are carried by an external ridge of each axial end of the surface 60 of the sleeve 58, and each pole piece 20, 22 is crimped in the bevel 66 and/or the recesses.

In FIGS. 2 to 4, by virtue of the sleeve 58, the thickness of the rotor, that is to say the distance between the front face of the front pole piece 20 and the rear face of the rear pole piece 22, is controlled precisely.

Figure 5:
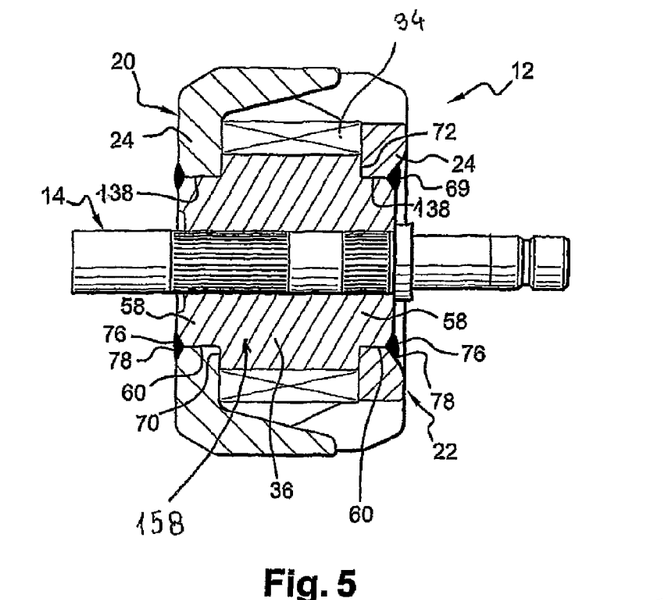
FIG. 5 is a view in axial section that depicts a second embodiment of the invention.

According to yet another variant of the invention depicted in FIG. 5, each pole piece 20, 22 is fixed to its intermediate sleeve 58 by welding. Thus a weld 69, preferably continuous, is produced between the periphery of the external ridge of the central bore 38 of the pole piece 20, 22 and the relevant sleeve 58. It is possible for example to carry out welding of the TIG type or welding of the laser type.

It should be noted that, compared with the embodiments in FIGS. 2 and 3, the core 36 is in this case integrated in the sleeve and constitutes the central part thereof.

More precisely, in this embodiment a hub 158 is provided that replaces the sleeve 58 and the core 36 in FIGS. 2 and 3.

This hub 158 comprises a central core 36 that therefore extends in radial projection with respect to a front intermediate sleeve 58 and a rear intermediate sleeve 58.

The front sleeve 58 is dedicated to the mounting of the front pole piece 20 and the rear sleeve 58 to the mounting of the rear pole piece 22.

These intermediate sleeves 58 are arranged axially on each side of the core 36.

The pole pieces 20, 22 are thus simplified and the central bore, here referenced 138, of each pole piece is shorter axially than the central bore 38 in FIGS. 2 and 3 since it affects only the flange 24 of each pole piece.

In addition, for the same outside diameter of the rotor, the height of the flanges 24 of the pole pieces 20, 22 is reduced since in this embodiment the outside diameter of the surfaces 60 is greater than that in FIGS. 2 and 3.

It will be appreciated that, in this embodiment, the thickness of the rotor is controlled even more precisely.

It will also be appreciated that wear on the excitation coil 34 is prevented since the distance between the pole pieces is precise, the pole pieces being in abutment against the projecting radial end faces 70, 72 of the core 36.

In addition the external periphery of the core 36 can be of any shape, for example cylindrical, rectangular or polygonal in shape.

Naturally, in FIGS. 2 to 4, the pole pieces can be fixed to the sleeve by welding. Likewise in FIG. 5 it is possible to fix the pole pieces to the sleeve by crimping.

The invention also proposes a method of producing such a rotor 12.

Hereinafter, the steps described and the operations that constitute them are numbered for reasons of clarity of the description; however, these steps and these operations can be performed in any order unless mentioned otherwise.

According to the teachings of the invention, the method of producing the rotor 12 of FIGS. 2 and 3 comprises a first step E1 of mounting the intermediate sleeve 58 that is prior to the mounting of each pole piece 20, 22.

Step E1 of mounting the sleeve 58 consists of axially force-fitting the driving portion or portions 57 of the shaft 14 in the fixing bore 59 of the sleeve 58 until the collar 114 comes into abutment on the sleeve 58.

Here the shaft 14 is fitted from the front in the bore 59 in order to cut furrows in the latter by means of reliefs, here in the form of serrations, on the portion or portions 57.

This fitting is achieved with reduced forces compared with those used in FIG. 1 so that the rear end of the shaft 14 with a smaller cross section for mounting the rings 42 is preserved. These rings, in one example embodiment, belong to a collector fitted on the smaller-diameter rear end of the shaft 14. Such a collector is described for example in the document FR A 2 710 200, to which reference can be made.

The production method also comprises a second step E2 of adjusting the concentricity of each pole piece 20, 22 with respect to the rotation axis of the shaft 14.

A first operation E21 of step E2 is implemented after the first step E1 of mounting the sleeve 58.

During this first operation E21, the surface 60 of the sleeve 58 is produced before the mounting of each pole piece 20, 22. The surface 60 is machined in the external peripheral face of the sleeve 58 so that the cylindrical surface 60 is concentric with the rotation axis of the shaft 14.

This operation E21 makes it possible to correct the lack of concentricity of the surface 60 of the sleeve 58 with respect to the rotation axis of the shaft 14, due to the uneven plastic deformation of the fixing bore 59 of the sleeve 58 around the driving portion or portions 57 with reliefs, here knurled, of the shaft 14.

It will be appreciated that the sleeve 58 can be standardized in diameter and therefore that an assembly of shaft 14 and sleeve 58 can serve for mounting pole pieces 20, 22 of different sizes in terms of diameter. The length of the sleeve 58 can easily be adjusted according to the application, the sleeve being obtained in FIGS. 2 and 3 from a tube.

The second step of adjusting the concentricity E2 also comprises a second operation E22 of the machining the central bore 38 each pole piece 20, 22, and a third operation E23 of machining the external peripheral cylindrical face of each pole piece 20, 22, that is to say here the external surface of the teeth 30, in order to define a precise air gap between the rotor and stator of the rotary electrical machine.

These last two operations E22, E23 make it possible to adjust the concentricity of the external peripheral face 32 of each pole piece 20, 22 with respect to the central bore 38 before the mounting of the pole piece 20, 22 on the shaft 14. These machining operations E22, E23 can therefore be performed without any risk of damaging the excitation coil 34. In addition, it is possible to use a lubricant during these machining operations, which makes the machining more rapid and less expensive.

Then a third step E3 of adjusting the axial positioning of each pole piece 20, 22 one with respect to the other is performed. This third step E3 comprises here only an operation E31 of machining the internal radial face of the associated half core 36.

This operation E31 makes it possible to adjust the axial positioning of the pole pieces 20, 22 with respect to each other.

During a fourth step E4, the excitation coil 34 is positioned on the core 36 and then a fifth step E5 of mounting the pole pieces 20, 22 is performed.

During this fifth step E5, the surface 60 of the sleeve 58 is fitted in the central bore 38 of the pole pieces 20, 22 so that the internal radial faces 62, 64 of each half core 36 are in abutment against each other. The pole pieces 20, 22 are thus pressed against each other in order to ensure the passage of a magnetic flux between them through their internal radial faces 62, 64.

This fifth step E5 is implemented after the first four steps E1, E2, E3, E4.

Finally, a final sixth step E6 of connection is performed after the step E5 of mounting each pole piece 20, 22. During this step E6, the pole pieces and the sleeve 58 are connected together with respect to rotation about the axis of the shaft 14 and with respect to translation, for example by welding or crimping.

According to a first variant, depicted in dotted lines in FIG. 3, of the first embodiment of the rotor 12, the core 36 forms a single piece which is distinct from the pole pieces 20, 22.

The sleeve 58 is interposed radially between the shaft 14 and each pole piece 20, 22 on the one hand and between the shaft 14 and the core 36 on the other hand.

The core 36 comprises two external radial end faces, delimiting the axial ends thereof, against each of which the internal face of the flange 24 of each pole piece 20, 22 is pressed.

In this variant, the axial positioning of one pole piece 20, 22 with respect to the other is achieved by the internal radial face of each flange 24, which is in abutment axially against a facing external radial face of the core 36.

The production method is modified accordingly.

Thus, after easily fitting the excitation coil 34 on the core 36, the fifth step E5 is broken down into a step E51 of mounting the core 36 on the shaft 14 during which the sleeve 58 is fitted in the core 36 and a step E52 of mounting each pole piece 20, 22.

Preferably, the step E51 of mounting the core is performed after the first step E1 of mounting the sleeve 58 and before the fifth step E52 of mounting each pole piece 20, 22.

Moreover, during the third step E3 of adjusting the axial positioning, the operation E31 of machining the internal faces 62, 64 of the half core 36 is here replaced by an operation of machining the internal face 62, 64 of each flange 24.

In addition, to allow a precise axial positioning of one pole piece with respect to the other, the third step E3 of adjusting the positioning comprises a second operation E32 of machining each external end radial face of the core 36.

Then the step E52 of mounting each pole piece 20, 22 is implemented, after the implementation of the first five steps E1, E51, E2, E3, E4. The pole pieces 20, 22 are axially fitted on each side of the core 34 on end positions of the cylindrical surface 60 of the sleeve 58, which thus form cylindrical surfaces able to receive the pole pieces 20, 22.

According to a second embodiment of the invention depicted in FIG. 5, the shaft 14 is directly fitted in the hub 158 and therefore in the central part thereof formed by the core 36.

The rotor 12 comprises here, in the aforementioned manner, two intermediate sleeves 58 that are arranged axially on each side of the core 36 and that are produced in one piece with the core 36, and in which the driving portion or portions 57 of the shaft 14 is or are fitted.

The outside diameter of the core 36 is greater than the outside diameter of the surface 60 of each sleeve 58. Thus the core 36 comprises two external end radial faces 70, 72 that project radially with respect to the sleeves 58 and delimit the axial ends of the core 36.

The surface 60 of each sleeve 58 is fitted in the central bore 138 of the associated pole piece 20, 22 so that the internal radial face 74 of the flange 24 of the pole piece 20, 22, delimiting respectively the rear axial end and the front axial end of the pole piece 20, 22, is in abutment against the projecting external radial face 70, 72 facing the core 36. The pole pieces 20, 22 are thus positioned axially with respect to each other.

In other words, the surfaces 60 are machined in a simple manner in each external cylindrical face of the axial end portions of the hub 158 comprising the core 36.

In the embodiment depicted in FIG. 5, each pole piece 20, 22 is fixed to its associated intermediate sleeve 58 by welding 69. For this purpose, two bevels 76, 78 are produced so as to coincide respectively in the external radial face of the flange 24 of the pole piece 20, 22 and in the external radial face of the associated sleeve 58.

According a variant shown in FIG. 4, the connection between each pole piece 20, 22 and its sleeve 58 is effected by crimping.

The production method described above is modified in order to be adapted to this second embodiment of the invention.

Thus the fifth step E5 is broken down into a step E51 of mounting the core 36 on the shaft 14, during which the sleeve 58 is fitted in the core 36, and a step E52 of mounting each pole piece 20, 22.

However, the step E51 of mounting the core is performed concomitantly with the first step E1 of mounting the sleeve since the sleeves 58 and the core 36 form a single piece in the form of a hub 158.

The step E51 of mounting the core is therefore performed before the fifth step E52 of mounting each pole piece 20, 22.

In addition, during the third step E3 of adjusting the axial positioning, the operation E31 of machining the internal faces 62, 64 of the half core 36 is here replaced by an operation of machining the internal face of each flange 24.

In addition, to permit a precise axial positioning of one pole piece with respect to the other, the third step of adjusting the positioning E3 comprises a second operation E32 of machining each external end radial face of the core 36.

Advantageously the second operation E32 of machining the core 36 is performed after the step E51 of mounting the core 36. This is because, when the sleeve 58 is force-fitted on the core 36, each end face of the core 36 is liable to be deformed. Thus, in order to guarantee a precise axial positioning of the pole pieces 20, 22 and so as to permit optimum contact between each pole piece 20, 22 and the core 36, it is preferable to carry out the machining of the core 36 after it is mounted on the sleeve 58.

Then the step E52 of mounting each pole piece 20, 22 is implemented, after the implementation of the first five steps E1, E51, E2, E3, E4. The pole pieces 20, 22 are fitted axially on each side of the core 34 on end portions of the cylindrical surface 60 of the sleeve 58, which thus form cylindrical surfaces able to receive the pole pieces 20, 22.

According to a variant, not shown, of the rotor 12, the core 36 and the two sleeves 58 are distinct elements. The shaft 14 is therefore fitted directly in the core 36, and the driving portions of the 57 of the shaft 14 are force-fitted in the sleeves 58, which are distributed axially on each side of the core 36.

The shaft 14 comprises in one embodiment a smooth portion between its two driving portions 57 associated with the sleeves 58. This smooth portion serves as a centering device for the core 36, the external periphery of the smooth portion of the shaft being in close contact with the internal periphery of the core 36 delimited by the internal bore of the core 36.

It should be noted that the driving portions 57 are shorter axially than in the embodiments in FIGS. 2, 3 and 5 so that the sleeves 58 are less deformed than in these figures.

The method of implementing this variant is similar to the method of implementing the second variant of the first embodiment. However, the step E5 of mounting the core 36 precedes here the first step E1 of mounting the sleeve 58 since the core 36 is mounted directly on the shaft 14 rather than on the sleeve 58 as is the case in the first embodiment.

In a third embodiment depicted in FIG. 6, the two driving portions 157, 257 of the central shaft 14 are shorter axially as in the aforementioned variant and, as in FIGS. 2 and 3, the core of the rotor 12 comprises two portions 36a, 36b.

A sleeve respectively 258, 358 is associated with each portion of the core 36a, 36b.

The sleeves 258, 358 are externally smooth and are in a single piece with the central shaft 14. These sleeves 258, 358 therefore issue from the shaft 14 and have different outside diameters, just like the driving portions 157, 257.

Each portion 157, 257 axially extends respectively the sleeve 258, 358.

The portion 157 is adjacent to the collar 114.

The outside diameter of the driving portion 257 is roughly equal to the outside diameter of the sleeve 258.

The outside diameter of the sleeve 258 is less than the outside diameter of the driving portion 157.

The outside diameter of the sleeve 358 is less than the outside diameter of the portion 257 and is therefore less than the outside diameters of the sleeve 258 and of the portion 157 with the largest outside diameter.

The central shaft 14 is therefore stepped in diameter.

The internal bores of the portions 36a, 36b are also stepped in diameter.

Each core portion has internally two portions with different diameters in order to cooperate respectively each with one of the portions 157, 257 and the associated sleeve 258, 358 of the shaft 14.

As can be seen in this FIG. 6 the portion 36b has a first part with an inside diameter less than that of its second part. This first part is delimited centrally by a cylindrical centering bore intended to come into close contact with the smooth external periphery of the sleeve 358 thus constituting a centering sleeve for the portion 36b and the pole piece 20. The second part of this portion 36b is shorter axially than the first portion and is intended to come into engagement with the driving portion 257 that is harder than the core portion 36b so that, when the shaft 14 is force-fitted in the portion 36b, the portion 257 cuts furrows in the second part for rotational connection of the shaft 14 with the pole piece 20. The second part is therefore delimited centrally by a fixing bore.

Likewise the portion 36a has internally two parts, referred to as the third and fourth parts, with different diameters. The third part has an inside diameter less than that of the fourth part. This third part is delimited centrally by a cylindrical centering bore intended to come into close contact with the smooth external periphery of the sleeve 258, thus constituting a centering sleeve for the portion 36a and the pole piece 22. The fourth part of this portion 36a is shorter axially than the third part and is intended to come into engagement with the driving portion 357 that is harder than the core portion 36a so that, when the shaft 14 is force-fitted in the portion 36a, the portion 357 cuts furrows in the fourth part for rotational connection of the shaft 14 with the pole piece 22. The fourth part is therefore delimited internally by a fixing bore.

Thus the inside diameter of the first part is less than the inside diameter of the second part, roughly equal to the inside diameter of the third, which is less than the inside diameter of the fourth part.

The result of the above and FIG. 6 is that each intermediate sleeve 258, 358 comprises at its external periphery a cylindrical surface coaxial with the central shaft 14, which is associated with each pole piece 20, 22 and which is received in a complementary central cylindrical bore of the associated pole piece 20, 22, so as to position the associated pole piece 20, 22 coaxially with the shaft 14.

Each intermediate sleeve 258, 358 is interposed radially between the core portion 36a, 36b and the shaft 14.

In this FIG. 6 the second part emerges at the internal end face 62 of the portion 36b while the fourth part emerges at the external end face of the portion 36a.

A groove 300 is provided at the front end of the shaft 14. This groove 300 is, in one embodiment, continuous.

During an operation of crimping the external face of the pole piece 20 the material of the pole piece 20 is made to flow into this groove 300 so that the pole pieces 20, 22 are finally locked axially between the collar 114 and the material 301 of the pole piece 20.

Thus the sleeves 258 and 358 and the pole pieces 20, 22 are machined in advance.

The step E1 of mounting the sleeves 258, 358 consists of producing a single-piece shaft with the sleeves 258, 358.

The second step E2 of adjusting the concentricity is easier since the first operation E21 of step E2 consists of machining the external periphery of the sleeves 258, 358 of the single-piece shaft 14, steps E22, E23, E3, E4 being performed in the aforementioned manner.

It should be noted that, during step E23, helical grooves 302 are produced at the external periphery of the rotor 12 in order to cut the eddy currents developed at the external peripheral face of the pole pieces as described in the document FR 2 774 524. Naturally this is applicable to the other embodiments.

Step E5 consists of fitting the sleeves 258, 358 in the central bore of the pole pieces so that the internal faces of the portions 36a, 36b are in abutment against each other and pressed so as to ensure passage of the magnetic flux.

This step is performed easily since the sleeve 358 and the driving portion 257 pass through the cylindrical central bore of the pole piece 22 without any problem, the sleeve 258 coming into centering contact with the pole piece 22 before the driving portions are force-fitted in the second and fourth portions of the pole pieces 20, 22.

Afterwards the crimping in the groove 300 is carried out, the collar 114 being in abutment on the pole piece 22 so that step E6 is simplified.

For the requirements of the description, the rotor 12 has been described here arranged in an alternator. However, the rotor 12 is not limited to this application.

In a rotor produced according to the prior art, the force that is necessary for mounting the pole pieces directly on the driving portion of the shaft is very high. Consequently the axial distance between the two pole pieces is poorly controlled and it is necessary to provide a wide tolerance gap.

By virtue of the teachings of the invention, the force sufficient for mounting the pole pieces 20, 22 on their associated intermediate sleeve 58 is sufficiently reduced to substantially decrease this tolerance gap.

In a rotor according to the prior art, it is thus necessary to provide a large clearance between each axial end of the excitation coil and the flange of each pole piece. The rotor 12 produced according to the teachings of the invention makes it possible to obtain a more precise axial positioning of the pole pieces 20, 22 with respect to each other. It is therefore possible to install a longer excitation coil 34 between the two pole pieces 20, 22, which makes it possible to increase the power of the alternator.

Advantageously, the precision of the axial distance between the two pole pieces 20, 22 of a rotor 12 according to the invention is improved compared with that of a rotor according to the prior art. It is thus possible to provide a excitation coil 34 that best occupies the space between the external periphery of the core 36 and the claws of the pole pieces, particularly in the context of the embodiment in FIG. 5.

It is also possible to better adjust the axial length of the stator body with respect to the axial length between the two pole pieces.

Likewise, the axial distance between the two pole pieces 20, 22 being better controlled, a rotor 12 according to the teachings of the invention makes it possible to arrange more powerful fans at the two ends of the rotor 12 without increasing the axial size of the alternator. Thus the rear fan 56 in FIG. 1 is in a variant a ventilation device comprising two superimposed fans as described for example in the document WO 2004/106748 (corresponding to U.S. Patent Application 2007/041843), to which reference should be made. This ventilation device with two superimposed fans makes it possible to properly cool the excitation coil ends of the stator coil 18, in particular when this stator coil 18 comprises, in the aforementioned manner, two three-phase windings in a delta offset by 30° and each connected to a bridge rectifier. This arrangement, associated with a mounting of permanent magnets between the teeth 30, when the number of pairs can be less than or equal to the number of pairs of poles of the rotor, makes it possible to properly adjust the characteristic curve of the alternator (current intensity according to the number of revolutions per minute of the alternator) according to the application.

Another advantage is that it is also possible to reduce the axial size of the alternator.

The ratio between the outside diameter of the core and the outside diameter of the rotor can also be better controlled.

In general terms the power of the alternator is better controlled and the losses thereof are reduced.

By virtue of the invention it is possible not to modify the shaft 14 of the rotor 12 and therefore to use a shaft 14 of the standard type.

Likewise the core 36 is not modified profoundly.

Naturally all combinations are possible. Thus in FIG. 5 the internal bore of the hub 158 can be configured like that in FIG. 6 and therefore comprise four parts for receiving the shaft 14 in FIG. 6.

The groove 300 can comprise annular sectors separated by bands of material, each sector being filled by the material of the pole piece, which flows following the crimping operation so that a rotational locking is achieved as in FIGS. 3 and 4.

The presence of the collar 114 is not obligatory, the movement of the shaft being able to be programmed by means of a device.

The driving portions 57, 157, 257 can have another shape and comprise for example a plurality of projections.

While the form of apparatus herein described constitute a preferred embodiment of this invention, it is to be understood that the invention is not limited to this precise form of apparatus, and that changes may be made therein without departing from the scope of the invention which is defined in the appended claims.

What is claimed is:

1. A rotor for an alternator in a motor vehicle, comprising:
   a) a shaft (14) having knurls (57) which extend from its outer surface;
   b) an intermediate sleeve (58) which
      i) is made of ferromagnetic material;
      ii) has been force-fitted onto the shaft (14);
      iii) contains an inner surface that frictionally engages force-fit onto the knurls (57) during force-fitting to prevent relative rotational movement between said intermediate sleeve and the shaft;
      iv) is fixed against relative rotation with respect to the shaft (14); and
      v) has been machined to have an outer surface (60) which is cylindrical and generally concentric with said shaft (14); and
   c) a left pole piece (20) and a right pole piece (22) that are arranged axially on each side of an annular core that is coaxial with the shaft, said annular core having a coil that extends radially around it, both of which contain bores (38) which
      1) have been machined to have an inner surface which is cylindrical, concentric with and of generally the same diameter as said outer surface (60); and
      2) surround and mate with the machined outer surface (60) so that said left pole piece (20) and said right pole piece (22) are arranged axially on each side of said annular core;
   said intermediate sleeve (58) being situated radially between said shaft and said inner surfaces of said left pole piece and said right pole piece after they are mounted on said intermediate sleeve.

2. The rotor as recited in claim 1, in which the left pole piece (20) contains a cavity (66), and said intermediate sleeve (58) has been crimped to form a flange which
   (i) extends into the cavity (66), and
   (ii) prevents relative rotation between the left pole piece (20) and said intermediate sleeve (58).

3. The rotor as recited in claim 1, in which said intermediate sleeve (58) was crimped after the left pole piece (20) was positioned on said intermediate sleeve (58).

4. The rotor as recited in claim 1, in which the right pole piece (22) contains a cavity (66), and said intermediate sleeve (58) has been crimped to form a flange which (i) extends into the cavity (66), and (ii) prevents relative rotation between the right pole piece (22) and said intermediate sleeve (58).

5. The rotor as recited in claim 4, in which said intermediate sleeve (58) was crimped after the right pole piece (22) was positioned on said intermediate sleeve (58).

6. The rotor as recited in claim 4, in which said intermediate sleeve (58) maintains the left pole piece (20) and the right pole piece (22) in a predetermined axial position on said intermediate sleeve (58).

7. The rotor as recited in claim 1, in which the shaft (14) has greater hardness than said intermediate sleeve (58).

8. The rotor as recited in claim 1, in which the pole pieces (20, 22) and said intermediate sleeve (58) are constructed of identical ferromagnetic material.

9. The rotor as recited in claim 1, in which
   1) the pole pieces (20, 22), said intermediate sleeve (58), and the shaft (14) are constructed of ferromagnetic material,
   2) the pole pieces (20, 22) carry an excitation coil which generates magnetic fields, and
   3) a continuous path of ferromagnetic material is present, through (A) a pole piece, (B) said intermediate sleeve, and (C) the shaft, for a magnetic field to follow in travelling from one coil to another.

10. The rotor as recited in claim 1, in which the rotor forms a core (36) which contains a continuous path of ferromagnetic material, through which a magnetic field flows and exits the core, to excite one or more stationary coils (18) adjacent the rotor, and supported by a stator.

11. The rotor as recited in claim 1, in which said intermediate sleeve (58) is fixed against relative rotation on the shaft (14) sufficiently to drive a pulley (40) of a motor vehicle alternator, when said pulley (40) is connected to the shaft (14).

* * * * *